US007769773B1

(12) United States Patent
Doubek et al.

(10) Patent No.: US 7,769,773 B1
(45) Date of Patent: Aug. 3, 2010

(54) RELEVANT RULE INSPECTOR FOR HIERARCHICAL DOCUMENTS

(75) Inventors: James W. Doubek, Sunnyvale, CA (US); Jorge Taylor, Burlingame, CA (US); Narciso B. Jaramillo, Oakland, CA (US); Sho Kuwamoto, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 579 days.

(21) Appl. No.: 10/930,679

(22) Filed: Aug. 31, 2004

(51) Int. Cl.
*G06F 7/00* (2006.01)
(52) U.S. Cl. .................... 707/769; 707/776
(58) Field of Classification Search .......... None
See application file for complete search history.

(56) References Cited

U.S. PATENT DOCUMENTS

| | | | |
|---|---|---|---|
| 6,550,057 B1 * | 4/2003 | Bowman-Amuah | 717/126 |
| 6,565,609 B1 * | 5/2003 | Sorge et al. | 715/234 |
| 6,613,098 B1 * | 9/2003 | Sorge et al. | 715/234 |
| 6,665,677 B1 * | 12/2003 | Wotring et al. | 1/1 |
| 6,985,889 B1 * | 1/2006 | Tapio et al. | 706/45 |
| 6,988,093 B2 * | 1/2006 | Pic et al. | 1/1 |
| 7,117,436 B1 * | 10/2006 | O'Rourke et al. | 715/205 |
| 7,200,820 B1 * | 4/2007 | Stephens | 715/838 |
| 2002/0059335 A1 * | 5/2002 | Jelbert | 707/500 |
| 2002/0111968 A1 * | 8/2002 | Ching | 707/514 |
| 2003/0060913 A1 * | 3/2003 | Turner et al. | 700/103 |
| 2003/0221168 A1 * | 11/2003 | Kozlov | 715/513 |
| 2003/0237047 A1 * | 12/2003 | Borson | 715/513 |
| 2004/0162849 A1 * | 8/2004 | Kumpitsch et al. | 707/103 R |
| 2004/0210556 A1 * | 10/2004 | Brooke et al. | 707/1 |
| 2004/0230903 A1 * | 11/2004 | Elza et al. | 715/513 |
| 2005/0022115 A1 * | 1/2005 | Baumgartner et al. | 715/513 |
| 2005/0198055 A1 * | 9/2005 | Mihaila et al. | 707/101 |
| 2006/0010374 A1 * | 1/2006 | Corrington et al. | 715/517 |
| 2006/0236223 A1 * | 10/2006 | Aubert et al. | 715/513 |

\* cited by examiner

*Primary Examiner*—Don Wong
*Assistant Examiner*—Shyue Jiunn Hwa
(74) *Attorney, Agent, or Firm*—Kilpatrick Stockton LLP

(57) ABSTRACT

A development environment is described that includes identifying relevant code or rules applicable to various elements of a hierarchical document and displaying the relevant code or rules to a user within a display interface of the development environment. The system recognizes document elements highlighted by a user and searches through a data structure of the code or rules applied to the hierarchical document for code or rules that expressly reference the element selected by the user. The system then searches the data structure of the code or rules applied to the parent elements of the selected element. The discovered code or rules are then displayed to the user in the development environment along with any properties that are associated with the code or rules. The development system determines which of the properties do not apply to the selected element and render a marker indicating the non-applicability of that property.

36 Claims, 7 Drawing Sheets

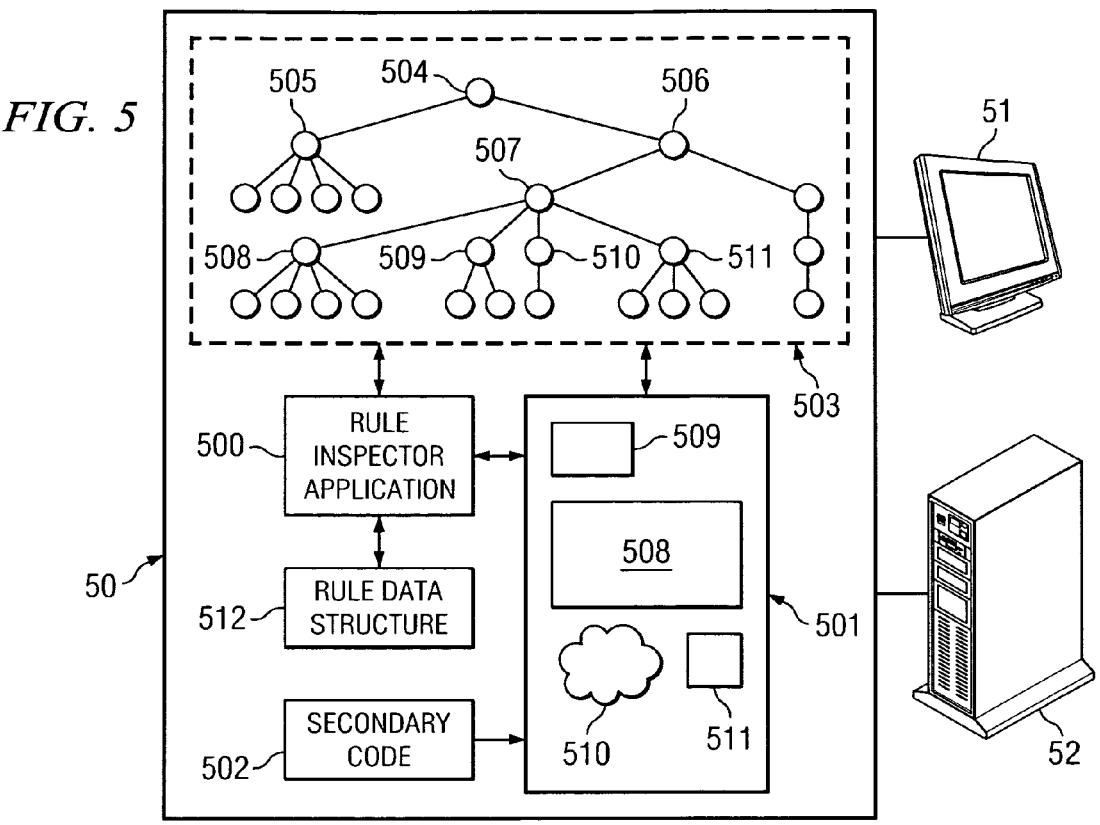
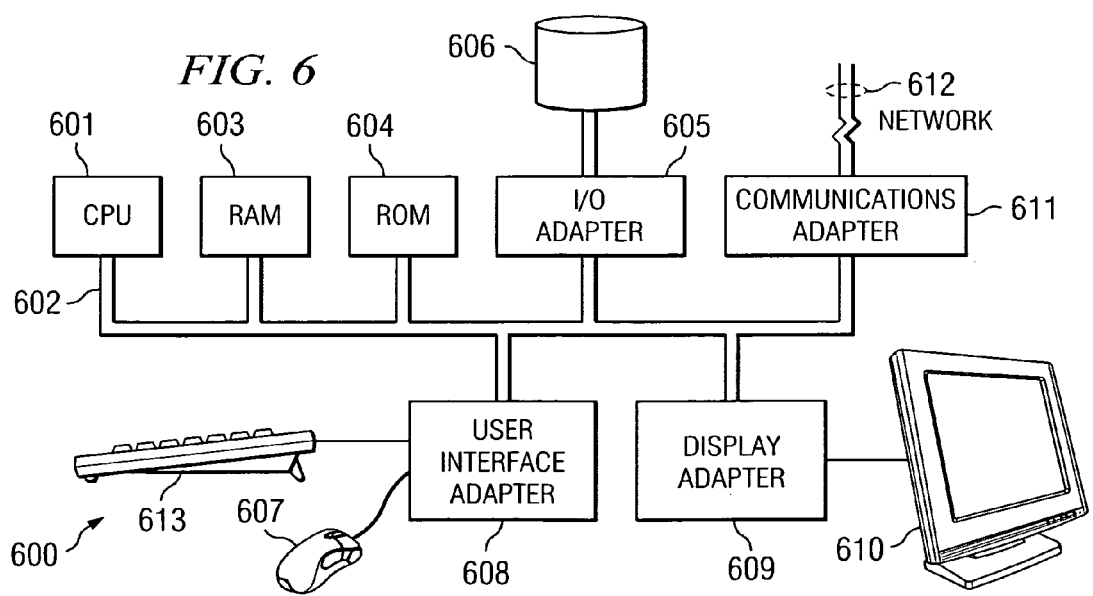

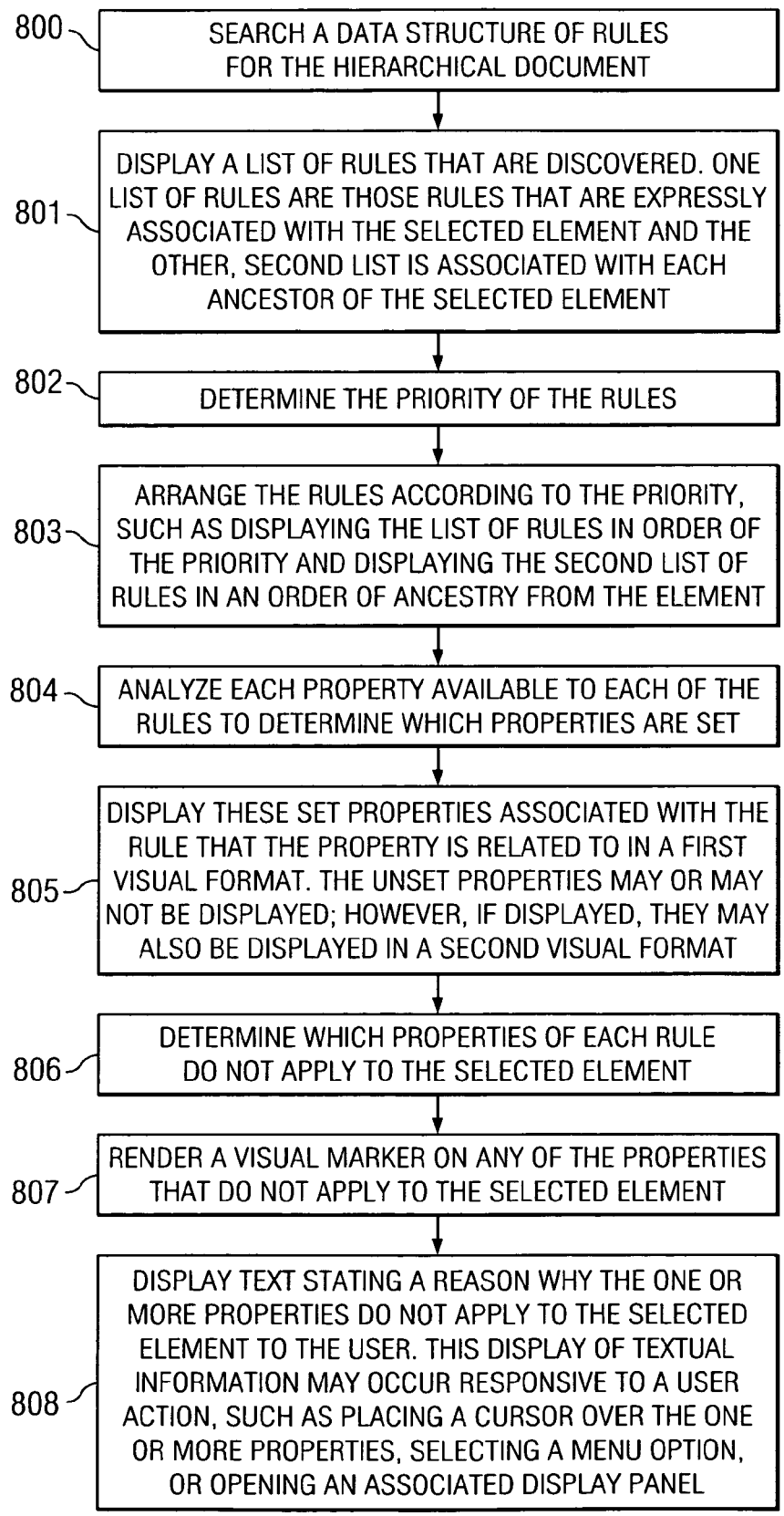

RELEVANT RULE INSPECTOR FOR HIERARCHICAL DOCUMENTS

TECHNICAL FIELD

The present invention relates, in general, to hierarchical documents and, more specifically, to a relevant rule inspector for hierarchical documents.

BACKGROUND OF THE INVENTION

Tag-based computer languages, such as Hypertext Markup Language (HTML), Extensible Markup Language (XML), and the like are used to implement various different computer-based applications, such as Web pages, database administration, and the like. One of the powerful features of such tag-based languages is the ability to create hierarchical documents. A Web page is an example of a hierarchical document. Outer structural groupings, such as paragraphs, tables, and the like, may contain child elements, whether structural or stylistic, that continue to define the look and feel of the Web page. Similarly, an XML document, as a hierarchical document, may define sets of records in which a parent element or data may contain child elements or data that describes the overall content of the data, as opposed to describing the appearance of the data as HTML does. Other computer or scripting languages, such as NETSCAPE COMMUNICATIONS CORPORATION's JAVASCRIPTT™, MICROSOFT CORPORATION's C#™, and the like, also may be used in developing hierarchical documents.

Hierarchical documents are very flexible and may be easily organized or abstracted into tree structures, such as a Document Object Model (DOM), that can then be used for further processing or analysis. Because of their highly organized structures, additional code or scripts may be applied to such hierarchical documents to perform additional functions, such as defining a display format or transforming the format of hierarchical document, or the like. For example, style sheet formatting, such as Cascading Style Sheet (CSS) rules, may be applied to HTML or XML documents to define the display formatting of the HTML as displayed in a Web browser. Moreover, Extensible Style sheet Language for Transformation (XSLT) scripts may be applied to XML documents to transform the content format of the document into a new content format.

The ability to use such secondary code, such as CSS and XSLT, to operate on hierarchical documents increases the flexibility, reusability, and extensibility of such documents. However, to effectively design, edit, and modify such hierarchical documents that make use of such secondary code, it is helpful for the developer to understand how this secondary code affects or controls the underlying content during the editing process. Such secondary code is typically governed by complex syntax and application rules that may only be understandable or even familiar to experienced developers. Existing tools that operate with such documents generally do not inform developers about each of the applicable rules of the secondary code that applies to any particular piece of content in the underlying document while the developer is editing the code or source of the document. Thus, a developer may not be able to easily find how a piece of content will be affected in the final operating version.

One example of such application is found in Web development environments. In creating Web pages in HTML, existing Web development environments provide CSS editors that assist the user in creating style sheet rules to be applied to the edited HTML document. CSS uses a complex syntax in which some defined formatting rules may apply to certain elements of the Web page even though the CSS rule is not directly applied to that element. Typically, only experienced developers choose to code Web pages with CSS because of the complexity of CSS syntax. In some existing Web development environments, however, features are provided that assist the developer determine what CSS rules apply to various different tags or markup. These rule inspectors may display the CSS rules that directly apply to an element being examined by a developer or may merely present the actual computed values of a particular property. While this information is useful, it may not tell the developer all of the information that may be useful in the editing process.

For example, NETSCAPE COMMUNICATIONS CORPORATION's MOZILLA™ family of Web browsers offer the DOM Inspector™ feature which allows a developer to view the DOM of a Web page, select an element from the DOM and then view the CSS rules that directly apply to that element in order of cascade priority. The DOM Inspector™ also shows the actual computed values for the attributes within the selected element. Still other applications, such as BRADBURY SOFTWARE LLC's TOPSTYLE™ CSS editor, provides a property inspector to the developer that lists the properties that are set in the CSS rule and the ones that are not. However, the function of TOPSTYLE™ is separate from the HTML document that the CSS rule may modify. Thus, using existing technology, it may be difficult for a developer to determine what rule or code applies to a particular element in the hierarchical document.

BRIEF SUMMARY OF THE INVENTION

The present invention is directed to a system and method identifying the relevant code or rules applicable to various elements of a hierarchical document and displaying the relevant code or rules to a user within a development environment. The system recognizes hierarchical document elements highlighted by a user and searches through a data structure of the code or rules applied to the hierarchical document for code or rules that expressly reference the element selected by the user. The system then searches the data structure of the code or rules applied to the parent elements of the selected element. The discovered code or rules are then displayed to the user in the development environment along with any properties that are associated with the code or rules. In various embodiments of the present invention, the selected elements may be organized in order or priority and/or parenthood, and displayed to the user in such order.

A determination is made within the development environment concerning which of the discovered code or rules, or the properties associated therewith, are applicable to the selected element. Based on that determination, a visible marker is rendered indicating the properties of the discovered code or rules that apply to the selected element. Different visible markers may also be rendered to indicate the properties of the discovered code that do apply to the selected element. As the user selects different elements within the hierarchical document, the system updates the relevant code or rule display within the development environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 is a block diagram illustrating an operating environment configured according to another embodiment of the present invention for working with a hierarchical document;

FIG. 6 illustrates a computer system adapted to use embodiments of the present invention;

FIG. 8 is a flowchart illustrating example steps used in implementing one embodiment of the present invention.

DETAILED DESCRIPTION OF THE INVENTION

Figure 1:
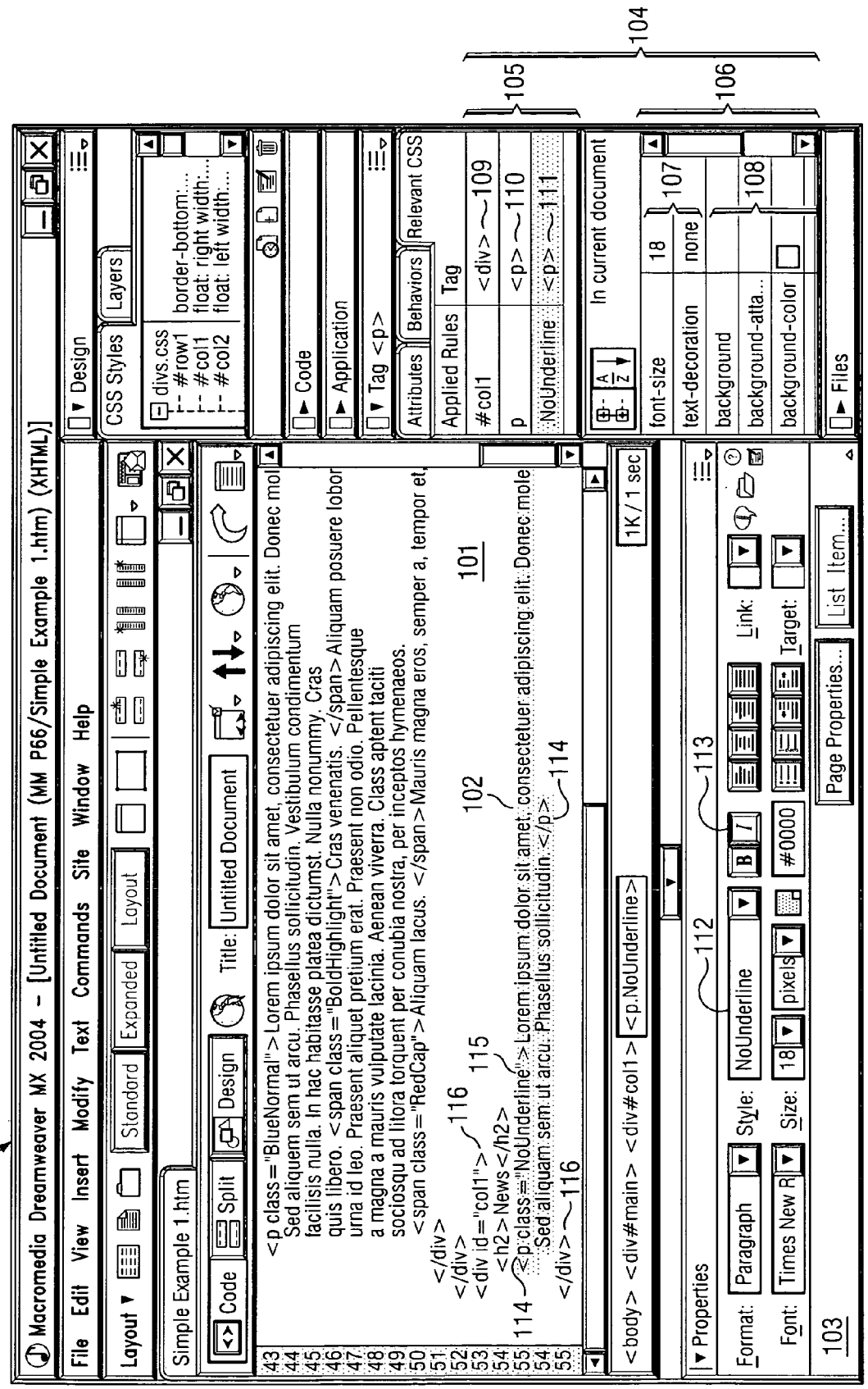
FIG. 1 is a screen shot of an HTML document edited in a Web development environment configured according to one embodiment of the present invention.

FIG. 1 is a screen shot of HTML document 101 edited in Web development environment 100 configured according to one embodiment of the present invention. Web development environment 100 allows users to create and edit Web pages in different modes, such as a code view, in which the underlying HTML code, such as HTML document 101, may be directly edited, a design view mode, in which the HTML code is rendered in a graphical display using technology similar to that used in a Web browser and in which the user may graphically manipulate elements on the Web page either directly or through a property tool bar, such as property inspector 103, or the like.

In the example illustrated in FIG. 1, a user has highlighted some of the content of HTML document 101 in highlighted section 102. In response, relevant CSS inspector 104 displays the CSS rules that apply to highlighted section 102. The properties that are applied directly to highlighted section 102 are shown in style interface 112 and italics indicator 113 within property inspector 103. Relevant CSS inspector 104 includes rule display 105, which lists the CSS rules applied to highlighted section 102, such as rules 109-111, and properties display 106, which lists the properties available for the particular rule selected in rule display 105 and identifies which of those available properties are set and applicable to highlighted section 102.

Properties display 106 displays set properties list 107 and unset properties list 108. Set properties list 107 is the list of properties that have been set for the selected CSS rule. The set properties illustrated in FIG. 1 are all applicable to highlighted section 102. Unset properties list 108 illustrate the properties available to the selected CSS rule, but which have not been set for that rule. Therefore, by glancing at Relevant CSS inspector 104, a user may determine which CSS rules apply to highlighted section 102, by viewing rule display 105, and which of the properties of any of the applicable CSS rules are set and applicable to highlighted section 102, by viewing properties display 106. In the illustrated embodiment, Web development environment 100 displays the text listing the properties in set properties list 107 in a blue color, while the text listing the properties in unset properties list 108 is displayed in black text.

It should be noted that various additional and/or alternative embodiments of the present invention may use different methods to distinguish between the set or defined and unset or undefined properties of a particular rule or code that is applicable to the selected element of the hierarchical document. Moreover, certain embodiments of the present invention may only include properties display 106 without providing any visual indicators to differentiate between the properties that are set or defined and the properties that are unset or not defined. Still other embodiments may only present the set properties and not the others. Thus, the descriptions of the illustrated embodiments of the present invention herein are not intended to limit the scope of how such properties are displayed.

In assembling the list of CSS rules displayed in rule display 105, Web development environment 100 determines which CSS rules expressly apply to the element encompassed by paragraph tags 114. Rule 'p' 110 includes a selector expression that explicitly nameS paragraphs as applicable elements. Rule NoUnderline 111 is applied directly to paragraph tags 114 through class identifier 115. Thus, Rule NoUnderline 111 is the most-specific rule applied to highlighted section 102. Therefore, rule 'p' 110 and rule NoUnderline 111 each expressly apply to highlighted section 102. Web development environment 100 then searches for each of the CSS rules that apply to the parent elements of highlighted section 102. The division element, div col1 116, is the parent element of paragraph tags 114. Therefore, Web development environment 100 selects all of the CSS rules that apply to div col1 16. In the described example, only rule #col1 109 applies to division div col1 16.

In the embodiment of the present invention illustrated in FIG. 1, Web development environment 100 orders the CSS rules in rule display 105 in the order of applicability and specificity in which the most-specific, directly-applicable rule, rule NoUnderline 111, is at the bottom of the list, the least-specific, directly-applicable rule, rule 'p' 110, is above rule NoUnderline 111, and the least-specific, inherited rule, rule #col1 109, is at the top of the list. In order to view the applicable properties for each of the displayed rules, the user may select the particular rule within rule display 105 of relevant CSS inspector 104. FIG. 1 illustrates rule NoUnderline 111 highlighted. Therefore, the properties displayed in properties display 106 are the properties available to rule NoUnderline 111. The properties listed in set properties list 107 are the properties of rule NoUnderline 111 that are set to some specific value, which value is indicated in properties display 106, and applicable to highlighted section 102.

Figure 2:
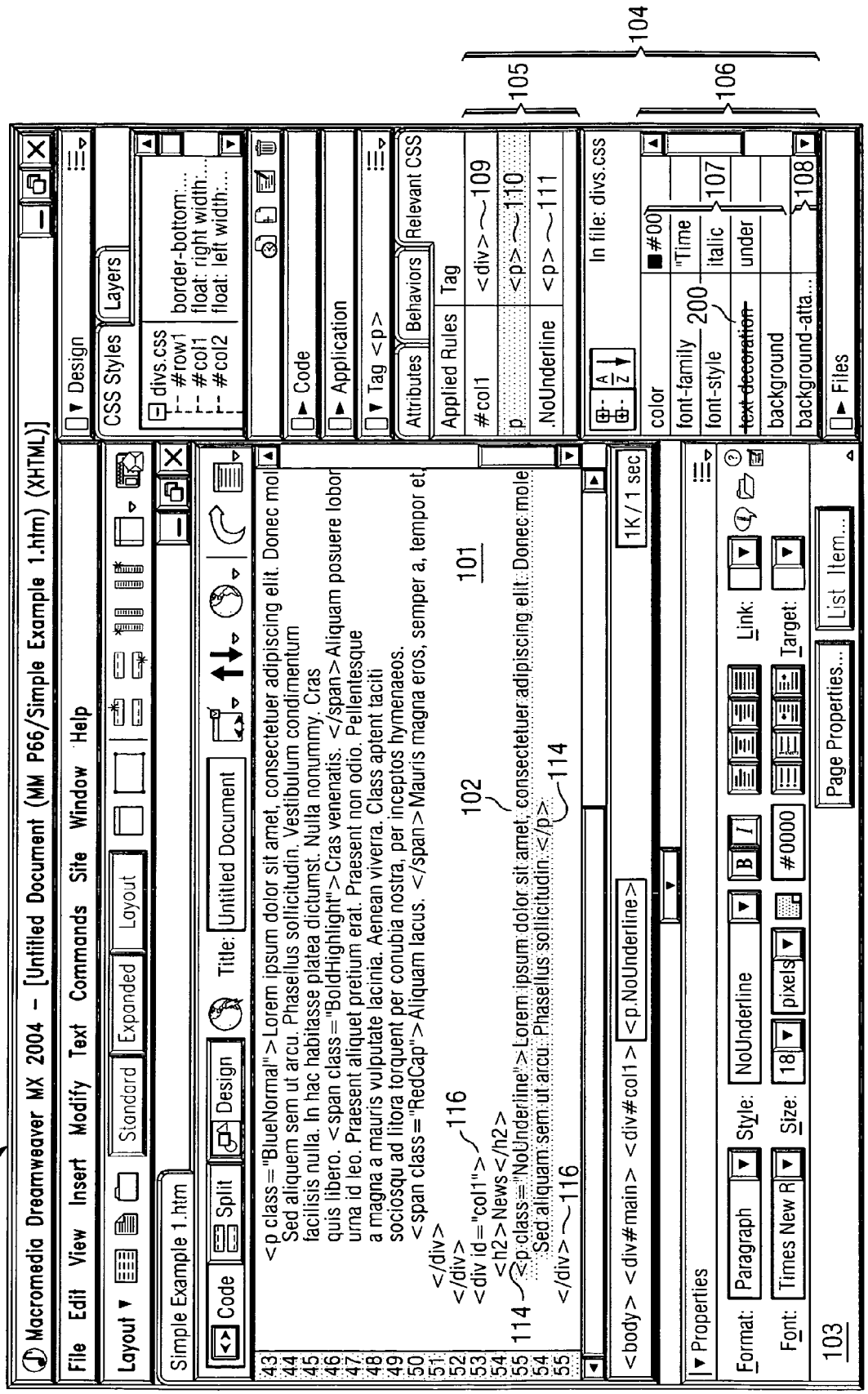
FIG. 2 is another screen shot of an HTML document edited in a Web development environment configured according to one embodiment of the present invention.

FIG. 2 is another screen shot of HTML document 101 edited in Web development environment 100 configured according to one embodiment of the present invention. In the illustrated editing process, the user has selected rule 'p' 110 within rule display 105 of relevant CSS inspector 104. Therefore, the list of properties displayed in properties display 106 change to those properties that are available to rule 'p' 110. The set properties are displayed in set properties list 107 and the unset properties are again displayed in unset properties list 108. However, not all of the set properties displayed in set properties list 107 are applicable to highlighted section 102. The text decoration property of underlined text that is included in rule 'p' 110 is not applied to highlighted section 102. Therefore, Web development environment 100 renders non-applicability indicator 200 over the property description that is not applied to highlighted section 102. Non-applicability indicator 200, thus, visually indicates to the user that the text decoration property of rule 'p' 110 does not apply.

Figure 3:
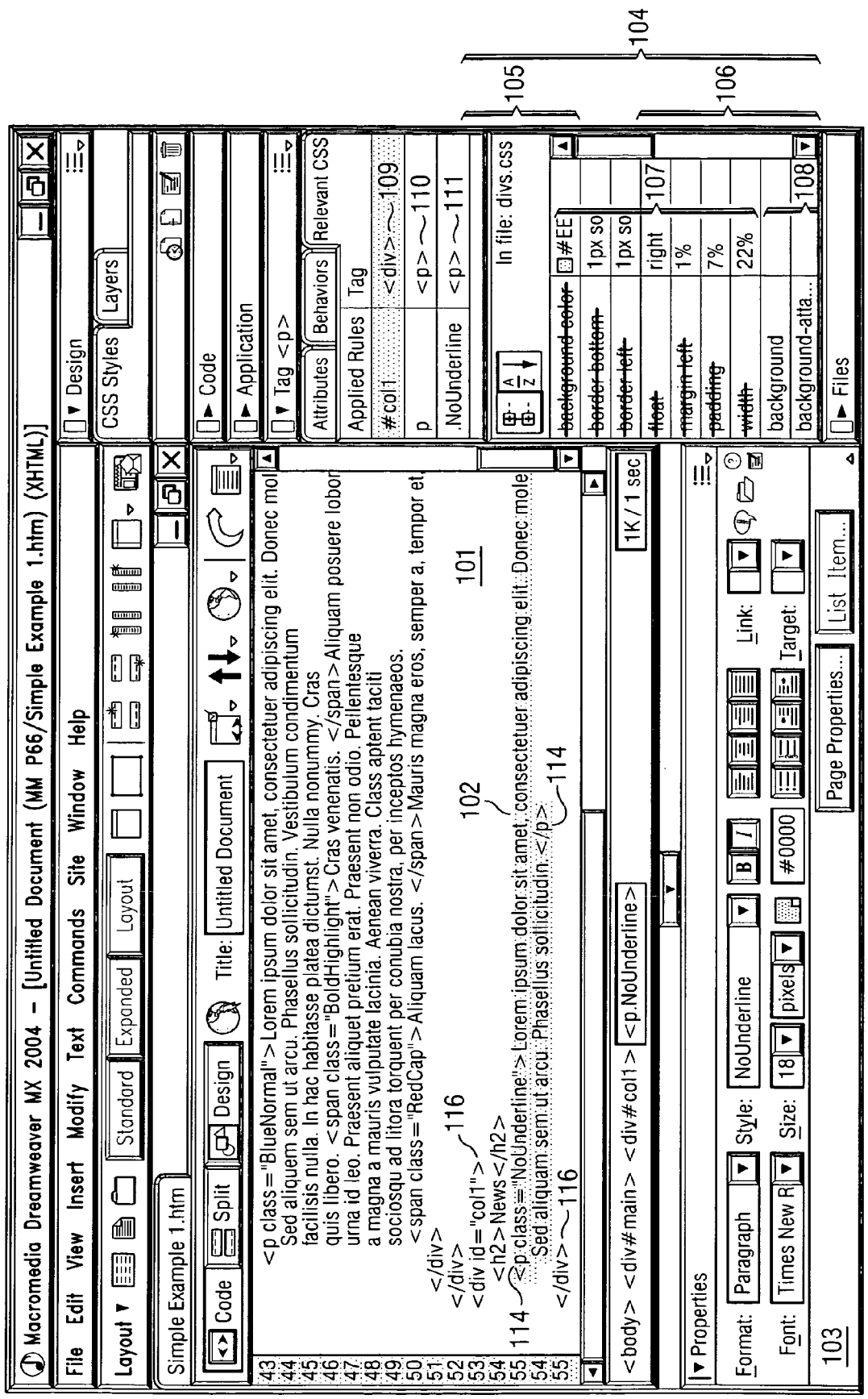
FIG. 3 is another screen shot of an HTML document edited in a Web development environment configured according to one embodiment of the present invention.

FIG. 3 is another screen shot of HTML document 101 edited in Web development environment 100 configured according to one embodiment of the present invention. As the illustrated editing process continues, the user has selected rule #col1 109 within rule display 105 of relevant CSS inspector 104. The list of properties displayed in properties display 106 again changes to reflect the properties available to rule #col1 109. Set properties list 107 displays the properties available to rule #col1 109 that have been set. As further illustrated in set properties list 107, none of the properties set for rule #col1 109 actually apply to highlighted section 102. As such, non-applicability indicator 200 (FIG. 2) is rendered by Web development environment 100 over each of the properties listed in set properties list 107.

In operation of selected embodiments of the present invention, a user may view each of the properties that are either applicable or not to selected elements within a hierarchical document. A relevant rule interface, such as relevant CSS inspector 104, provides the user a visual display of such rules and their applicability to any selected element within the edited hierarchical document. The user may step through each of the rules gathered by the selected embodiment of the present invention to view the applicable code, rules, and/or properties.

Figure 4:
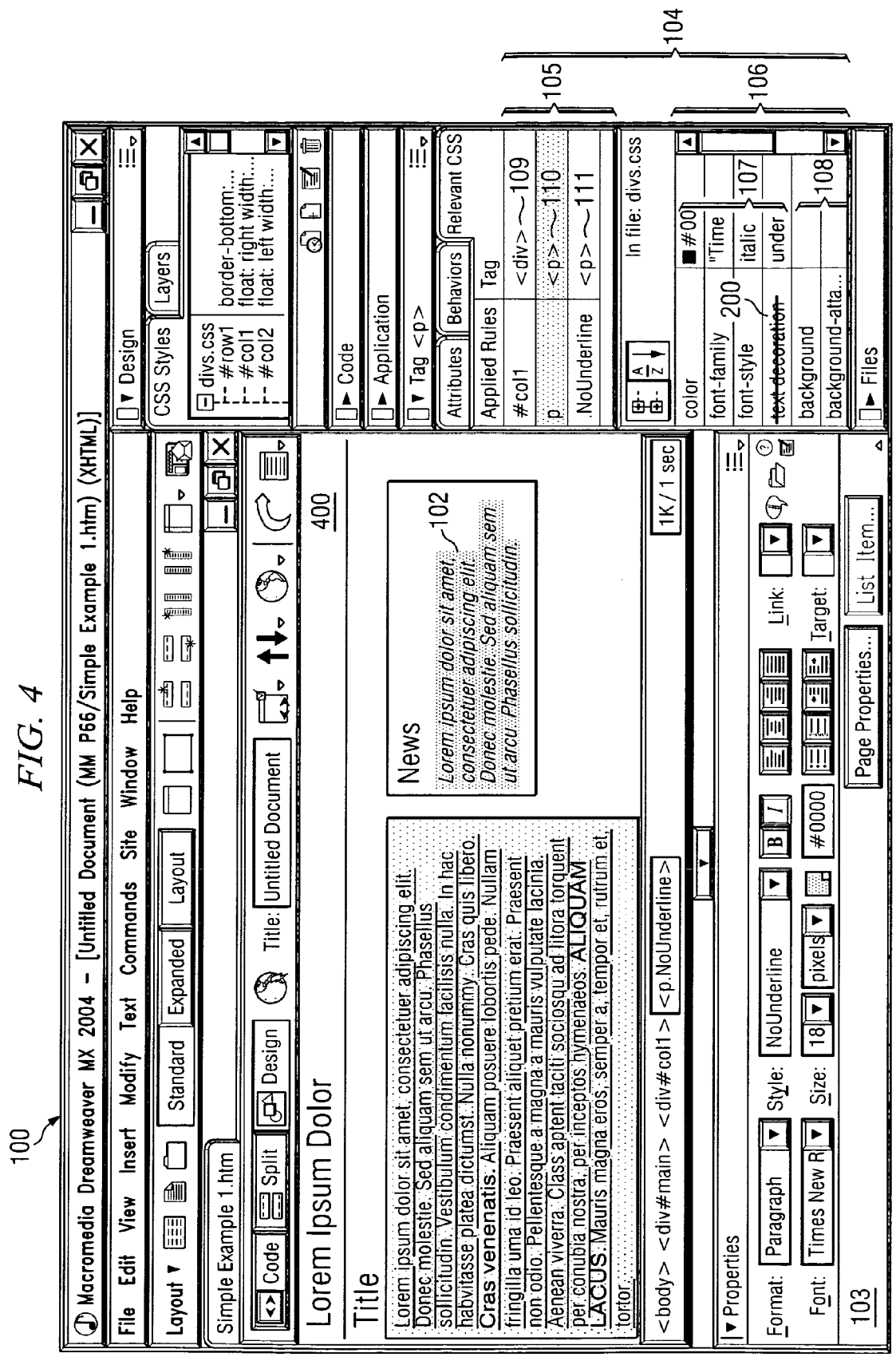
FIG. 4 is a screen shot of a Web page edited in a design view of a Web development environment configured according to one embodiment of the present invention.

FIG. 4 is a screen shot of Web page 400 edited in a design view of Web development environment 100 configured according to one embodiment of the present invention. In the previous examples, the various embodiments of the present invention were illustrated in the context of the user editing an HTML document, HTML document 101 (FIG. 1), in the code view of Web development environment 100. The example shown in FIG. 4 illustrates that another embodiment of the present invention may be applied while the user edits in the design view of Web development environment 100.

As the user selects highlighted section 102 within Web page 400, relevant CSS inspector 104 of Web development environment 100 determines the CSS rules that explicitly apply to the Web page element identified in highlighted section 102. The CSS rules associated with each of the parent elements of the element identified in highlighted section 102 are also gathered. The resulting CSS rules are then displayed in relevant CSS inspector 104 in rules display 105. The properties of the applicable rules are then displayed in properties display 106. In the illustrated example, the user has selected rule 'p' 110, which results in the properties set for rule 'p' 110 being displayed in set properties list 107 and the properties that are not set for rule 'p' 110 being displayed in unset properties list 108 in a different color. Because the text decoration property of rule 'p' 110 does not apply to highlighted section 102, non-applicability indicator 200 is rendered on that property to show the user that, while that particular property is set, it does not apply to highlighted section 102.

Although the embodiments of the present invention illustrated in FIGS. 1-4 dealt with style sheet rules as they are applied to HTML or Web documents, various additional and/or alternative embodiments of the present invention are equally applicable to other technologies that apply secondary code or rules to an underlying hierarchical document, such as applying XSLT transforms to XML documents, and the like. The present invention is not limited solely to Web page development.

FIG. 5 is a block diagram illustrating operating environment 50 configured according to another embodiment of the present invention for working with hierarchical document 501. Operating environment 50 includes rule inspector application 500 for analyzing the application of secondary code 502 to hierarchical document 501. Hierarchical document 501 may be a hierarchical document such as a Web page, an XML document, a DOM-based JAVASCRIPTT™ document, and the like. Secondary code 502 may be rules or code such as CSS rules, XSLT transformations, and the like, that may be applied to underlying hierarchical document 501 for controlling some aspect of its appearance or functionality.

Hierarchical document 501 includes a number of document elements, such as elements 508-511, that are arranged in some related fashion on hierarchical document 501. Hierarchical document 501 may be a visually-oriented document that would be rendered on display 51, such as a Web page, or may be an information-oriented document in which the organization of the information contained is the function of the document. It may also be a logic-oriented document, such as a programming script or code, that performs some kind of functionality through the processing capabilities of computer 52.

As secondary code 502 operates on hierarchical document 501, operating environment 50 maintains or creates a database or data structure, rule data structure 512, that stores the various code or rules from secondary code 502 as it applies to the various elements of hierarchical document 501. For example, in Web development environments, because the development environment typically displays the rendered version of the Web page or displays the underlying HTML code using specific formatting to assist the user in editing the Web page, several data structures are maintained that set out the relationship of the various rules, attributes, properties, and relationships of the documents and information it uses to display the edited Web page or underlying HTML to the user. The Web development environment would use these data structures to correctly render the Web page or correctly display the underlying HTML code with the formatting that it provides.

Hierarchical documents 501 may be represented graphically in a tree-like structure, such as DOM 503. A Document Object Model (DOM) is essentially an interface tool that explains what properties of a document that a script or other logic may retrieve, as well as which properties may be altered. It also may define functions or methods that may be called on the document. It is oftentimes used as a tree-like representation of a particular hierarchical document, such as hierarchical document 501. The represented hierarchies and parent-child relationships may be easily determined in such a DOM, such as DOM 503.

When a user selects a particular element within hierarchical document 501, such as element 508, rule inspector application 500 searches rule data structure 512 for all rules or code that specifically apply to element 508. Rule inspector application 500 then searches rule data structure 512 for the rules or code that specifically applies to the parent elements of element 508, such as element 507, element 506, and element 504, as illustrated in DOM 503. Rule inspector application 500 arranges the various code and/or rules that result from the search of rule data structure 512 in some kind of order, such as by order or priority, order of parenthood, some combination of orders, and the like. Rule inspector application would then display the rules to the user on display 51. Some code or rules may also include properties or definitions that describe the details of the application of the code or rules. These properties or definitions may also be displayed to the user associated with the code or rules that it relates to. Because operating environment 50 operates with hierarchical document 501, it contains logic that interprets the different rules and code in order to properly display hierarchical document 501 to the user. Therefore, rule inspector application 500 determines which of the rules or code or the related properties apply to the selected elements of hierarchical document 501 and which do not and then visually indicates on display 51 which of the rules, code, or related properties apply to the selected element and which do not. The user it, thus, able to easily see the code, rules, and/or properties that effect the elements of hierarchical document 501.

The program or code segments making up the various embodiments of the present invention can be stored in a computer readable medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The code segments may be downloaded via computer networks such as the Internet, Intranet, and the like.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, etcetera. Note that the printer may be a printer (e.g. dot matrix, laser, etcetera.), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, etcetera to the computer system 600. The display card 609 is driven by CPU 601 to control the display on display device 610.

Figure 7:
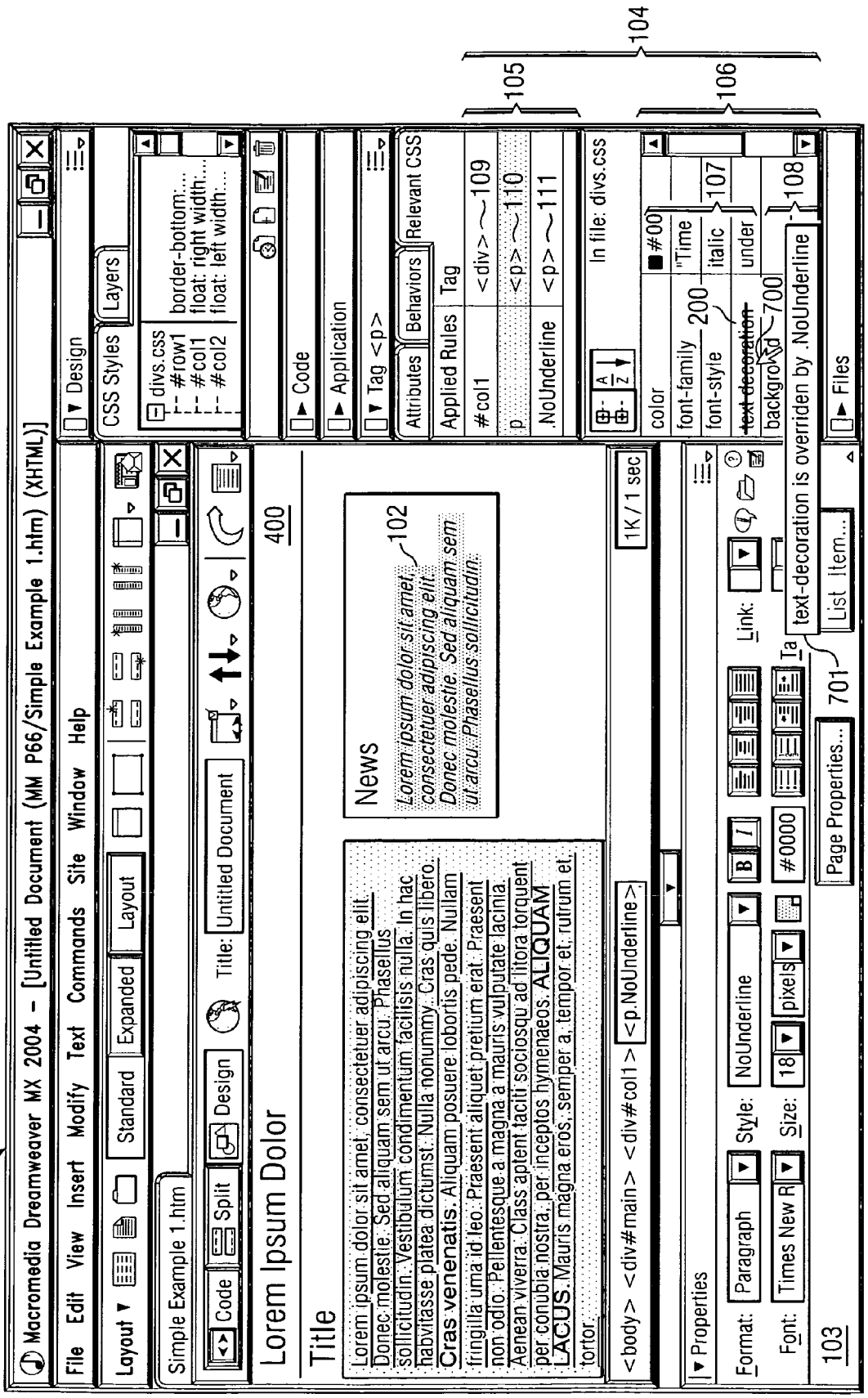
FIG. 7 is a screen shot of a Web page edited in a design view of a Web development environment configured according to another embodiment of the present invention.

FIG. 7 is a screen shot of Web page 400 edited in a design view of Web development environment 100 configured according to another embodiment of the present invention. As the user highlights the selection of highlighted section 102 and then highlights rule 'p' 110, the properties related to the selected rule are, thereafter, displayed in properties display 106. The embodiment of Web development environment 100 illustrated in FIG. 7 includes a tooltip feature that allows the user to obtain information on why any particular rule or property does not apply to the selected element. For example, the user may hold cursor 700 over the text decoration property within set properties list 107. When cursor 700 hovers over the text decoration property, popup box 701 appears that includes information on why the property does not apply to highlighted section 102. Therefore, the user is able to understand why the selected element, highlighted section 102, appears the way it appears within the design view.

It should be noted that how and where such additional information appears is not limited to the example illustrated in FIG. 7. Additional and/or alternative embodiments of the present invention may provide a separate information panel or add room to an existing panel in order to display the reason why a certain rule or property does not apply to the selected element. Moreover, another embodiment may provide a menu selection to obtain such information. Various methods for providing this additional information are covered by the scope of the different embodiments of the present invention.

FIG. 8 is a flowchart illustrating example steps used in implementing one embodiment of the present invention. In step 800, a data structure of rules for the hierarchical document is searched. In step 801, a list of rules that are discovered are displayed. One list of rules are those rules that are expressly associated with the selected element and the other, second list is associated with each ancestor of the selected element. Priority of the rules is then determined, in step 802. In step 803, the rules are arranged according to the priority, such as displaying the list of rules in order of the priority and displaying the second list of rules in an order of ancestry from the element. Each property available to each of the rules is then analyzed, in step 804, to determine which properties are set. These set properties are then displayed associated with the rule that the property is related to, in step 805, in a first visual format. The unset properties may or may not be displayed; however, if displayed, they may also be displayed, in step 805, in a second visual format. In step 806, a determination is made as to which properties of each rule do not apply to the selected element. A visual marker is rendered, in step 807, on any of the properties that do not apply to the selected element. In step 808, text is displayed to the user stating a reason why the one or more properties do not apply to the selected element. This display of textual information may occur responsive to a user action, such as placing a cursor over the one or more properties, selecting a menu option, or opening an associated display panel.

What is claimed is:

1. A method for displaying one or more rules associated with a selected element of a hierarchical document, said method comprising:

displaying a list of display rules expressly associated with said selected element;

displaying a second list of display rules associated with each ancestor of said selected element, wherein each display rule of said list of display rules and second list of display rules comprises a rule name and a set of properties;

determining one or more display rules of said list of display rules and second list of display rules and one or more properties of at least one display rule of said list of display rules and said second list of display rules that do not apply to said selected element;
displaying said one or more properties, wherein said one or more properties are displayed associated with said each display rule that said one or more properties are related to; and
rendering a visual marker for said one or more display rules of said list of display rules and second list of display rules and for said one or more properties indicating non-applicability to said selected element.

2. The method of claim 1 further comprising:
determining a priority of said list of display rules; and
arranging said displayed list of display rules in order of said priority.

3. The method or claim 1 further comprising:
arranging said displayed second list of display rules in an order of ancestry from said element.

4. The method of claim 1 further comprising:
searching a data structure of rules for said hierarchical document prior to said displaying said list of display rules and said second list of display rules.

5. The method of claim 1 further comprising:
analyzing each property available to each rule of said list of display rules and said second list of display rules to determine which of said each property is a set property.

6. The method of claim 5 wherein said displaying said one or more properties comprises:
displaying said each property that is determined to be said set property.

7. The method of claim 5 wherein said displaying said one or more properties comprises:
displaying each property that is determined to be said set property in a first visual format; and
displaying each property that is determined not to be said set property in a second visual format.

8. The method of claim 1 further comprising:
displaying text to a user stating a reason why said one or more properties do not apply to said selected element.

9. The method of claim 8 wherein said displaying text is responsive to an action of said user, wherein said action comprises at least one of:
placing a cursor over said one or more properties;
selecting a menu option: and
opening an associated display panel.

10. A method for editing a hierarchical document comprising:
detecting a user-selection of an element in said hierarchical document;
responsive to said detecting, searching a cascading style sheet (CSS) rule data structure for one or more express CSS rules citing said element;
responsive to said detecting, searching said CSS rule data structure for one or more ancestor rules associated with one or more ancestors of said element, wherein each rule of said one or more express CSS rules and said one or more ancestor rules comprises a rule name and a set of properties;
displaying in a rule interface said one or more express CSS rules and said one or more ancestor rules;
determining said one or more ancestor rules, said one or more express CSS rules, and ones of said set of properties that do not apply to said element; and
inserting in said rule interface a visual mark associated with ones of said one or more ancestor rules, said one or more express CSS rules, and said ones of said set of properties that do not apply to said element.

11. The method of claim 10 further comprising:
arranging said displayed one or more express CSS rules in an order of priority of application to said selected element; and
arranging said displayed one or more ancestor rules in an order of parenthood.

12. The method of claim 10 further comprising:
analyzing each property of said set of properties to determine which of said each property is a set property.

13. The method of claim 12 wherein said displaying comprises:
displaying in said rule interface said rule name of said one or more express CSS rules and said one or more ancestor rules; and
displaying said each property that is determined to be said set property, wherein said each property is displayed associated with its related said rule name.

14. The method of claim 12 wherein said displaying comprises:
displaying in said rule interface said rule name of said one or more express CSS rules and said one or more ancestor rules;
displaying each property that is determined to be said set property in a first visual format; and
displaying each property that is determined not to be said set property in a second visual format, wherein each property is displayed associated with its related said rule name.

15. The method of claim 10 further comprising:
displaying text to a user stating a reason why said one or more properties do not apply to said selected element.

16. The method of claim 15 wherein said displaying text is responsive to an action of said user, wherein said action comprises at least one of:
placing a cursor over said one or more properties;
selecting a menu option; and
opening an associated display panel.

17. The method or claim 10 further comprising:
arranging said one or more express CSS rules on said rule interface in an order of priority.

18. The method of claim 17 further comprising:
arranging said one or more ancestor rules on said rule interface in an order of parenthood.

19. A computer program product having a non-transitory computer readable medium with computer program logic recorded thereon for displaying one or more display rules associated with a selected element of a hierarchical document, said computer program product comprising:
code for displaying a list of display rules expressly associated with said selected element, said display rules defining characteristics of an output presentation to be displayed responsive to an application interpreting said selected element;
code for displaying a second list of display rules associated with each ancestor of said selected element, wherein each display rule of said list of display rules and second list of display rules comprises a rule name and a set of properties;
code for determining one or more display rules of said list of display rules and second list of display rules and one or more properties of at least one display rule of said list of display rules and said second list of display rules that do not apply to said selected element;
code for displaying said one or more properties, wherein said one or more properties are displayed associated with said each rule that said one or more properties are related to; and code for rendering a visual marker for said one or more display rules of said list of display rules and second list of display rules and for said one or more properties indicating non-applicability to said selected element.

20. The computer program product of claim 19 further comprising:
code for determining a priority of said list of display rules; and
code for arranging said displayed list of display rules in order of said priority.

21. The computer program product of claim 19 further comprising:
code for arranging said displayed second list of display rules in an order of ancestry from said element.

22. The computer program product of claim 19 further comprising:
code for searching a data structure of rules for said hierarchical document prior to said code for displaying said list of display rules and said second list of display rules.

23. The computer program product of claim 19 further comprising:
code for analyzing each property available to each rule of said list of display rules and said second list of display rules to determine which of said each property is a set property.

24. The computer program product of claim 23 wherein said code for displaying said one or more properties comprises:
code for displaying said each property that is determined to be said set property.

25. The computer program product of claim 23 wherein said code for displaying said one or more properties comprises:
code for displaying each property that is determined to be said set property in a first visual format; and
code for displaying each property that is determined not to be said set property in a second visual format.

26. The computer program product of claim 19 further comprising:
code for displaying text to a user stating a reason why said one or more properties do not apply to said selected element.

27. The computer program product of claim 26 wherein said code for displaying text is executed responsive to an action of said user, wherein said action comprises at least one of:
placing a cursor over said one or more properties;
selecting a menu option; and
opening an associated display panel.

28. A system for editing a web page document comprising:
means for detecting a user-selection of an element in said web page document;
responsive to said detecting, means for searching a display rule data structure for one or more express display rules citing said element, said one or more display rules defining characteristics of an output presentation to be displayed responsive to a browser interpreting said selected element of said web page document;
responsive to said detecting, means for searching said display rule data structure for one or more ancestor rules associated with one or more ancestors of said element, wherein each rule of said one or more express display rules and said one or more ancestor rules comprises a rule name and a set of properties;
means for displaying in a rule interface said one or more express display rules and said one or more ancestor rules;
means for determining said one or more ancestor rules, said one or more express display rules, and ones of said set of properties that do not apply to said element; and
means for inserting in said rule interface a visual mark associated with ones of said one or more ancestor rules, said one or more express display rules, and said ones of said set of properties that do not apply to said element.

29. The system of claim 28 further comprising:
means for arranging said displayed one or more express display rules in an order of priority of application to said selected element; and
means for arranging said displayed one or more ancestor rules in an order of parenthood.

30. The system of claim 28 further comprising:
means for analyzing each property of said set of properties to determine which of said each property is a set property.

31. The system of claim 30 wherein said means for displaying comprises:
means for displaying in said rule interface said rule name of said one or more express display rules and said one or more ancestor rules; and
means for displaying said each property that is determined to be said set property, wherein said each property is displayed associated with its related said rule name.

32. The system of claim 30 wherein said means for displaying comprises:
means for displaying in said rule interface said rule name of said one or more express display rules and said one or more ancestor rules;
means for displaying each property that is determined to be said set property in a first visual format; and
means for displaying each property that is determined not to be said set property in a second visual format, wherein each property is displayed associated with its related said rule name.

33. The system of claim 28 further comprising:
means for displaying text to a user stating a reason why said one or more properties do not apply to said selected element.

34. The system of claim 33 wherein said means for displaying text is responsive to an action of said user, wherein said action comprises at least one of:
placing a cursor over said one or more properties;
selecting a menu option; and
opening an associated display panel.

35. The system of claim 28 further comprising:
means for arranging said one or more express display rules on said rule interface in an order of priority.

36. The system of claim 35 further comprising:
means for arranging said one or more ancestor rules on said rule interface in an order of parenthood.

* * * * *